United States Patent
Rumph

(10) Patent No.: US 6,851,845 B2
(45) Date of Patent: Feb. 8, 2005

(54) METHOD AND APPARATUS FOR PROCESSING WASTE MATERIAL

(75) Inventor: Robert M. Rumph, Sumter, SC (US)

(73) Assignee: The Maitland Company, Inc., Sumter, SC (US)

( * ) Notice: Subject to any disclaimer, the term of this patent is extended or adjusted under 35 U.S.C. 154(b) by 111 days.

(21) Appl. No.: 10/131,086

(22) Filed: Apr. 25, 2002

(65) Prior Publication Data

US 2002/0196703 A1 Dec. 26, 2002

Related U.S. Application Data

(63) Continuation-in-part of application No. 09/523,376, filed on Mar. 10, 2000.

(51) Int. Cl.⁷ .............................. B01F 7/08; B01F 7/20; B01F 15/02
(52) U.S. Cl. ................. 366/142; 366/150.1; 366/163.1; 366/183.1; 366/191
(58) Field of Search .............................. 366/139, 150.1, 366/163.1, 183.1, 314, 318, 348, 191, 142, 194, 196

(56) References Cited

U.S. PATENT DOCUMENTS

| | | |
|---|---|---|
| 1,652,960 A | 12/1927 | Snelling et al. |
| 4,059,134 A | 11/1977 | Violette |
| 4,177,575 A * | 12/1979 | Brooks ........................ 34/392 |
| 4,329,090 A | 5/1982 | Teague et al. |
| 4,957,222 A | 9/1990 | Rolfe |
| 5,071,290 A | 12/1991 | Johnson |
| 5,275,487 A | 1/1994 | Rumph |
| 5,306,110 A | 4/1994 | Cline |
| 5,351,630 A * | 10/1994 | Lister et al. ............. 110/165 A |
| 5,371,911 A | 12/1994 | Mullinax |
| 5,417,169 A | 5/1995 | Carpenter et al. |
| 5,741,108 A | 4/1998 | Rolfe |
| 6,186,654 B1 | 2/2001 | Gunteret, Jr. et al. |

OTHER PUBLICATIONS

DuPont Sulfur Products, 2003.*

* cited by examiner

*Primary Examiner*—David Sorkin
(74) *Attorney, Agent, or Firm*—Finnegan, Henderson, Farabow, Garrett & Dunner, L.L.P.

(57) ABSTRACT

Methods and apparatuses are provided to process material contained in one or more drums. In one exemplary method, waste material is transferred from one or more drums to a first tank. Waste material in the first tank is agitated with an agitator contained in the first tank, and the waste material is passed from the first tank to a second tank on a mobile wheeled chassis. The method also includes transporting the second tank from a location where the first tank is located.

32 Claims, 4 Drawing Sheets

METHOD AND APPARATUS FOR PROCESSING WASTE MATERIAL

This application is a continuation-in-part (CIP) of application Ser. No. 09/523,376, filed Mar. 10, 2000 (pending).

BACKGROUND OF THE INVENTION

1. Field of the Invention

The present invention relates to an apparatus and method for processing waste material contained in drums. The invention has particular advantages associated with processing industrial waste such that the industrial waste can be incinerated or disposed.

2. Description of Related Art

Industrial facilities generate significant amounts of both hazardous and non-hazardous waste material. Typically, this waste is placed in barrels, such as 55 gallon cylindrical barrels, and stored on-site at the industrial facility until the barrels are transported to an appropriate waste treatment facility, where the barrels are emptied and the material is either processed for incineration or disposal in a landfill. For example, when the barrels contain sludge and/or solids, a waste processing facility will often remove these substances and blend them with liquid to generate a slurry capable of being burned in a cement kiln or general incinerator. However, this current process of waste treatment has many drawbacks and disadvantages.

Shipping the barrels containing the industrial waste limits the amount of waste that can be transported to the processing facility. In addition, substances in the barrels sometimes leak or spill because some barrels are not designed for use as transportation vessels. For example, moisture collected under a metal barrel could cause the bottom of the barrel to rust away, which sometimes leads to formation of a hole capable of causing leakage during transportation.

When the barrels are reused, the empty barrels often must be shipped back to the industrial facility after the material is removed at the processing facility. For industries where a significant amount of waste is generated, these transportation requirements can substantially increase the overall cost of waste treatment. In addition to the increased cost associated with the transportation, the use of the barrels as transportation vessels also requires maintaining a relatively large inventory of barrels for use in both the transit of material and the on-site storage of material.

Relying upon waste treatment facilities is another drawback associated with some existing waste material processing. Governing authorities impose a significant number of laws and regulations related to the treatment of waste material. Consequently, waste processing facilities are very costly to operate and, in some areas where there is a heavy concentration of industry, there are shortages of these facilities. For certain industries that generate large amounts of hazardous substances, material processing facilities charge a relatively significant fee for their services. For example, when barrels are used to transport material to the processing facility, a processing facility might charge additional fees associated with removing material from the barrels and the unloading and loading of barrels from/to vehicles.

Although most waste treatment facilities are reliable, they may handle waste material improperly. For example, a processing facility might intentionally or unintentionally dispose of industrial waste in a landfill rather than blending the waste and incinerating it in accordance with the instructions of an industrial facility. If certain materials are disposed in this manner, an environmental hazard could be created. In such circumstances, laws and regulations may hold the original industrial facility at least partially liable for the enormously expensive task of cleaning-up the environmental hazard, even when the industrial facility had no intent of disposing the waste material in this manner.

In light of the foregoing, there is a need for improving the processing of waste material.

SUMMARY OF A FEW EXEMPLARY ASPECTS OF THE INVENTION

The present invention is directed to methods and apparatuses that may substantially obviate one or more of the limitations of the related art.

As embodied and broadly described herein, one aspect of the invention includes a method of processing waste material, wherein the method includes transferring waste material from one or more drums to a first tank. Waste material in the first tank is agitated with an agitator contained in the first tank, and the waste material is passed from the first tank to a second tank on a mobile wheeled chassis. In the method, the second tank is transported from a location where the first tank is located.

As used herein, the term "drum" refers to any type of container configured to contain waste material. The drum may be sized to permit the drum to be moved from one location to another, either completely manually or through the use of one or more devices, such as, for example, a fork lift or a wheeled frame. For example, the drum may be sized to contain a maximum volume of up to about 350 gallons of material, or up to about 100 gallons, or about 55 gallons. By way of example, the interior volume of the drum may range from about 20 gallons to about 350 gallons, or it may range from about 20 gallons to about 100 gallons, or it may be about 55 gallons. In one exemplary aspect, the drum may be a generally cylindrical barrel, formed of steel and having a volume of about 55 gallons. However, the present invention, in its broadest sense, could be practiced to process material contained in many different types, sizes, and shapes of drums.

The term "waste material," as used herein, may relate to one or more byproducts resulting from at least one process and having relatively little or no substantial use or worth. The waste material may be a substance generated, for example, during an industrial process. In some examples, waste material may be a substance that is generally disposed, destroyed (e.g., incinerated), and/or recycled in a process associated with one entity (e.g., a waste material generator or other entity possessing the waste material) paying a fee to another entity handling the disposal, destruction, and/or recycling of the substance. The waste material may include hazardous and/or non-hazard waste material and may be in the form of a liquid, solid, semi-solid (e.g., sludge), and/or mixtures thereof. At least part of the waste material may be either flammable in air or non-flammable in air.

In one aspect, waste material from a plurality of drums may be transferred to the first tank. The waste material may be transferred from each of the drums at least partially simultaneously or one at a time. When material is transferred from more than one barrel, the agitating may mix together waste material transferred from different drums.

In another aspect, the agitator may include one or more rotatable sets of blades, and the agitating may include rotating the blades. For example, the rotation of the blades may cause liquid in the first tank to be directed toward a floor of the first tank.

In yet another aspect, the agitator may include a rotatable auger, and the agitating may include rotating the auger.

In a further aspect, the amount of material in the first tank may be sensed. An exemplary method could include sensing the volume of material in the tank and providing an indication of the sensed volume. For example, the sensing may include sensing when the level of material in the first tank reaches a predetermined level, and the method may further include providing an indication that the sensed level has reached the predetermined level. In an exemplary embodiment, providing an indication may include sending information via a network.

In an even further aspect, the second tank may be transported to a facility configured to provide disposal and/or incineration of waste material, and the method may further include off-loading material from the second tank at the facility.

In an additional aspect, the method may include transporting the second tank to a further location where a third tank is located, wherein the third tank contains waste material from at least one drum, and the method may further include passing waste material from the third tank to the second tank.

Additionally, another aspect of the present invention may include a waste material processing apparatus including a tank and an agitator configured to agitate waste material in the tank. The agitator may include a rotatable set of blades and a rotatable auger. The apparatus may also include a drum dumper configured to dump waste material from one or more drums into the tank.

While the invention has particular applicability in processing industrial waste material capable of being blended and then incinerated and/or disposed in a landfill, it may be used to process many other types of waste material. Thus, it is to be understood that both the foregoing general description and the following detailed description are exemplary.

BRIEF DESCRIPTION OF THE DRAWINGS

The accompanying drawings are included to provide a further understanding of certain features of the invention and are incorporated in and constitute a part of this specification. The drawings illustrate embodiments of the invention and, together with the description, serve to explain the principles of the invention. In the drawings.

DESCRIPTION OF EXEMPLARY EMBODIMENTS

Figure 1:
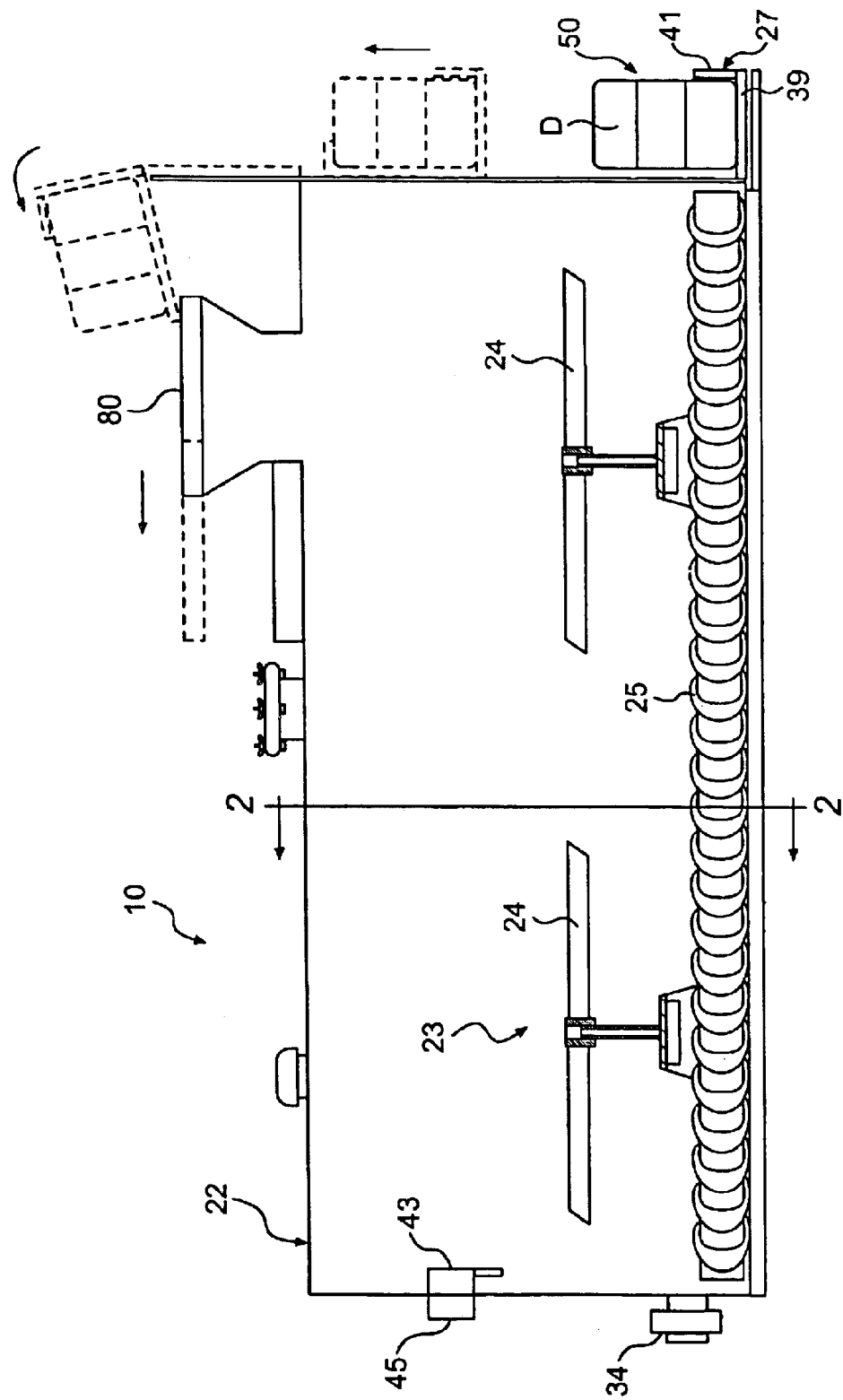
FIG. 1 is a schematic side view of an exemplary embodiment of an apparatus in accordance with the invention, wherein broken lines and arrows illustrate movement of a drum dumper and a cover during dumping of waste material from a drum to a tank.

Reference will now be made in detail to exemplary embodiments of the invention, examples of which are illustrated in the accompanying drawings. Wherever possible, identical reference characters are used in the drawings and the description to refer to the same parts, and reference characters differing from one another by only the presence or absence of an alphabet letter suffix are used to refer to parts that may have at least some similarity.

Figure 2:
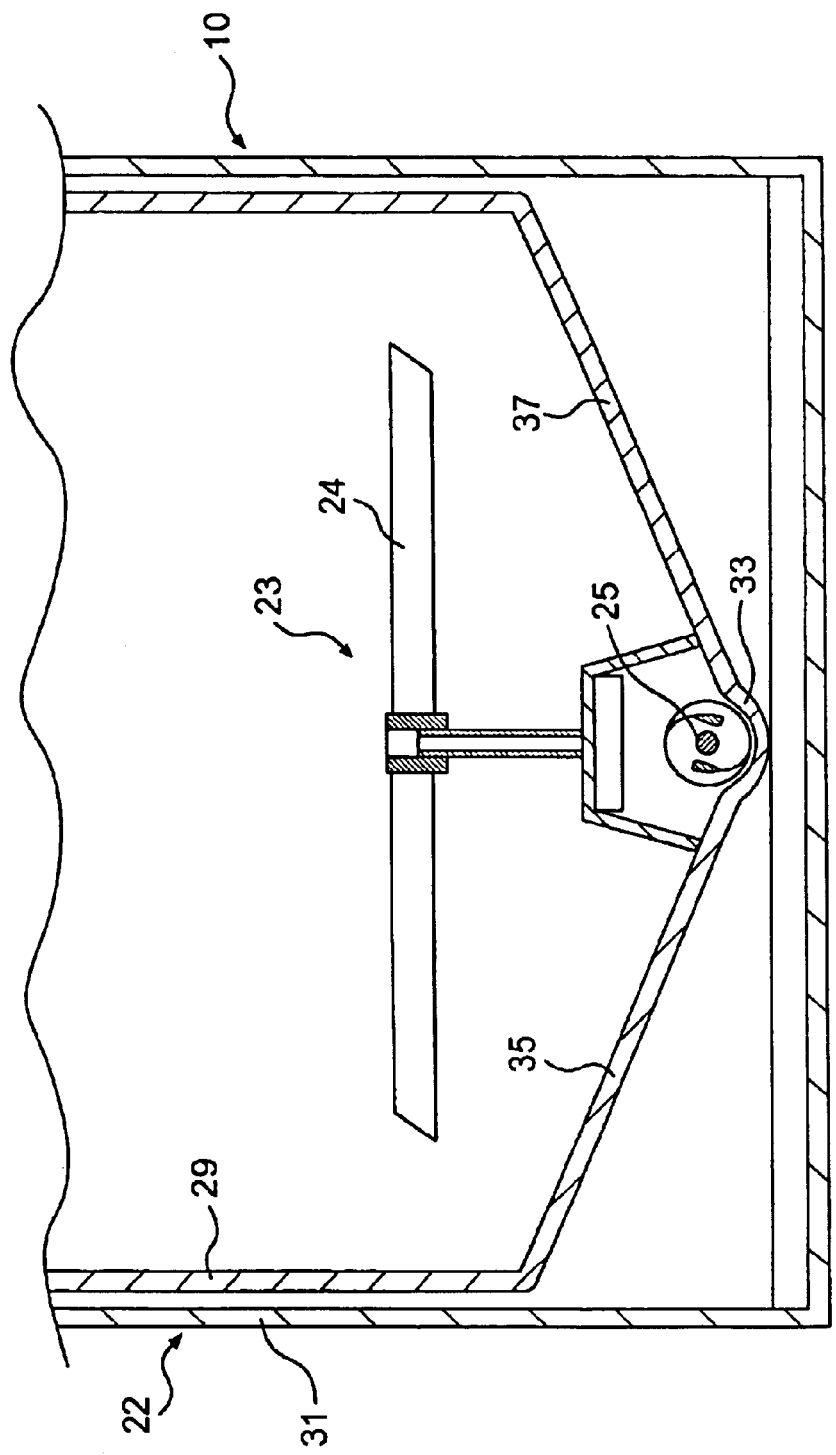
FIG. 2 is a schematic, partial cross-section view taken along line 2—2 of FIG. 1.

FIGS. 1 and 2 show an exemplary embodiment of a waste material processing apparatus 10 in accordance with the present invention. The apparatus 10 includes a tank 22, an agitator 23 including one or more rotatable sets of blades 24 and a rotatable auger 25, and a drum dumper 27. As explained in more detail below, waste material contained in one or more drums D may be transferred to the tank 22 using the drum dumper 27, and the waste material in the tank may be agitated using the agitator 23.

The tank has an inlet 30 through which waste material is passed as it is transferred from drums D being dumped by the drum dumper 27, and an outlet 34 configured to be flow coupled to an additional tank provided on a mobile wheeled chassis, as described below. The tank 22 could be configured in a variety of different sizes. In one example, the tank 22 is configured to enable up to about 7500 gallons of waste material to be contained in the tank 22. As shown in FIG. 2, the tank 22 has at least one inner wall 29 forming an inner container configured to primarily contain the waste material and at least one outer wall 31 forming an outer container at least partially surrounding the inner container and being configured to provide a secondary containment for any waste material that might leak from the inner container, for example, in the event of a leak in the inner wall 29.

A floor of the tank 22 has a trough 33 that extends along the length of the tank 22 and has a substantially arc-shaped inner surface. The trough 33 may be formed by cutting away a top portion of a pipe along its length. The floor of the tank 22 also includes a pair of portions 35 and 37 sloping in opposite directions, downward toward the trough 33, for example, at angles of about 34 degrees. The sloping portions 35 and 37 direct sediment in the tank 22 toward the trough 33.

The rotatable auger 25 is positioned adjacent to the tank floor above the arc-shaped inner surface of the trough 33. For example, the auger 25 includes at least one helical groove and may have a maximum diameter of about 10 inches. Rotation of the auger 25 may loosen solid and/or semi-solid waste material sedimenting in and around the trough 33 and also convey that material from an end of the tank 22 adjacent to inlet 30 to an end of the tank 22 adjacent to outlet 34. The loosening and conveyance of the sediment material may spread out the material so that it may be blended with liquid in the tank 22.

The rotatable sets of blades 24 are supported in the interior of the tank between the floor and ceiling of the tank 22. Each set of blades 24 may have four blade tips extending outwardly from a respective axis of rotation about which the blade set rotates. Rotation of the sets of blades 24 may direct liquid in the tank 22 toward the tank floor and thereby blend the liquid with solid and semi-solid material loosened by rotation of the auger 24, for example, to form a slurry capable of being passed from the tank 22 via the outlet 34. For example, the sets of blades may be configured so when the blades rotate, tips of the rotating blades define a diameter of about six feet.

The sets of blades 24 and the auger 25 may be rotated by one or more motors (not shown) coupled to the blade sets 24 and auger 25 in any known manner. The motors could be either fully contained in the interior of the tank 22 or one or more of the motors could be located outside of the tank 22 and be connected to a drive shaft passing through a sealed passage leading into the tank 22. The motors may be motors that are configured so that they do not generate any sparks (i.e., non-sparking motors). For example, the motors could be hydraulic motors driven via hydraulic power, such as that supplied by a vehicle like a truck or tractor, for example. Alternatively, any other form of motor arrangement may be used to rotate the blade sets 24 and auger 25.

As mentioned above, the drum dumper 27 is configured to dump waste material from one or more drums D into the tank 22 via the inlet 30. The drum dumper is positioned in a drum processing area 50 located at the end of the tank 22 adjacent to the inlet 30. The drum dumper 27 includes a platform 39 and a drum mount 41 extending from the platform 39. The platform 39 is configured so that one or more drums D may be placed on the platform and mounted thereto via the drum mount 41. As schematically illustrated by the broken lines and arrows shown in FIG. 1, the drum dumper 27 is configured to move the platform 39 carrying one or more drums D vertically upward, slightly above the top of the tank 22, and then to rotate the platform 39 and thereby dump waste material from the drum(s) D into the inlet 30, before rotating the platform 39 in the opposite direction and lowering it to receive one or more additional drums containing waste material. The vertical movement and rotation of the platform 39 could be achieved through a variety of different arrangements that would be evident to those of ordinary skill in the art. For example, the platform 39 may be moved vertically and rotationally via one or more motors (not shown) driven by electricity or any other type of motor.

The drum mount 41 may be any structural arrangement capable of mounting a drum to the platform 39. For example, the drum mount 41 may include a mounting strap and/or arm arranged to wrap around at least a portion of the drum. In another example, the drum mount 41 could be a grip configured to grasp the drum D from its bottom.

As shown in FIG. 1, the apparatus 10 may include a movable cover 80 configured to move between a closed position covering the inlet 30 and an open position permitting waste material to be dumped from drum D. The cover could be configured to move in any manner evident to one of ordinary skill in the art and that movement could be controlled so that the cover 80 moves to the open position (shown with broken lines and a horizontal arrow in FIG. 1) when the drum dumper 27 is activated to dump waste material into the tank 22, while returning to the closed position after the material is dumped. Optionally, when the cover 80 is in the closed position the tank 22 and cover 80 could be configured to substantially limit or prevent escape of any gas and/or volatile substance that might be contained in the tank 22.

The apparatus 10 may also include a sensor 43 configured to sense the amount of waste material in the tank 22 and a transmitter 45 configured to transmit information via a network, wherein the information is indicative of the sensed amount. The sensor 43 may be a float switch arranged to sense when the level of waste material in the tank 22 reaches a predetermined level. For example, when the tank 22 has a capacity of about 7500 gallons, the float switch may be configured to detect when the tank 22 contains about 5700 gallons of waste material. Those of ordinary skill in the art should appreciate that the volume of material in the tank 22 could be sensed by numerous alternative structural arrangements other than a level sensor such as a float switch.

As explained below, the information transmitted by the transmitter 45 may be used to provide an indication that the amount of waste material in the tank 22 is nearing the full capacity of the tank 22. The information may be transferred from the transmitter 45 via a variety of differing types of networks. The term "network" may include a public network such as the Internet or a telephony network, a private network, a virtual private network, or any other mechanism for enabling communication between two or more nodes or locations. The network may include one or more of wired and wireless connections. Wireless communications may include radio transmission via the airwaves; however, those of ordinary skill in the art will appreciate that various other communication techniques can be used to provide wireless transmission including infrared line of sight, cellular microwave, satellite, BLUETOOTH packet radio and spread spectrum radio. Wireless transmission may include, but is not limited to, paging, text messaging, e-mail, Internet access and other specialized data applications specifically excluding, or including voice transmission. Other types of networks include local area networks, metropolitan area networks, wide area networks, ad hoc networks, or any mechanism for facilitating communication between two nodes or remote locations.

In accordance with the invention, there is also provided a method of processing waste material. This method is explained with reference to the structural embodiment described above and also in connection with an alternative embodiment shown in FIGS. 4 and 5. However, it should be understood that the method of the invention could be practiced with structure other than that disclosed herein. In addition, the structure of the present invention could be used in processes other than those described herein.

Figure 3:
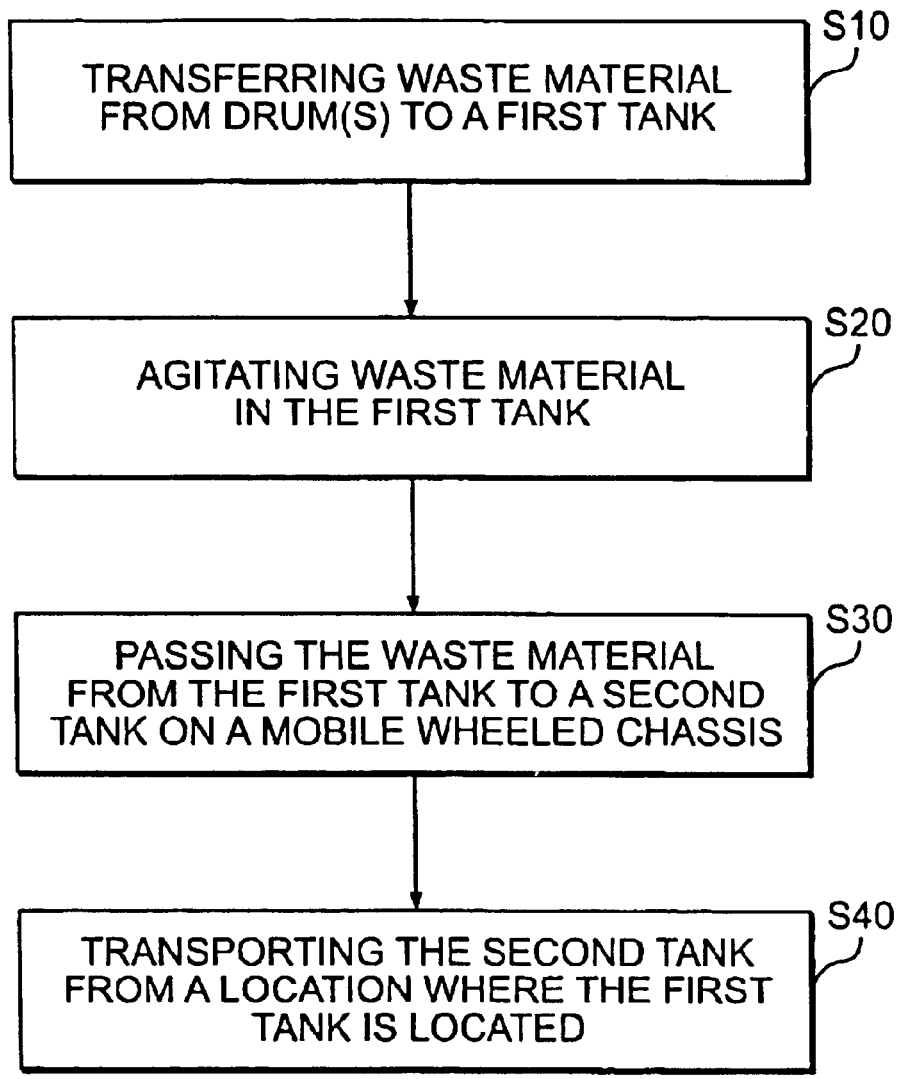
FIG. 3 is a flow chart illustrating an exemplary method in accordance with the invention.

FIG. 3 is a flow chart schematically illustrating an exemplary waste material processing method in accordance with the invention. The method includes transferring waste material from one or more drums to a first tank (S10), agitating waste material in the first tank with an agitator contained in the first tank (S20), passing the waste material from the first tank to a second tank on a mobile wheeled chassis (S30), and transporting the second tank from a location where the first tank is located (S40).

The transferring of waste material from the drum(s) to the first tank (S10) may be accomplished in a number of different fashions. For example, the apparatus 10 shown in FIG. 1 could be involved in performing the waste material transferring by using the drum dumper 27 to dump waste material from one or more drums D into the tank 22 so that the tank 22 provides the first tank. After possibly removing a respective top lid cover (not shown) from one or more drums D containing waste material, the drum(s) D may placed in the processing area 50 and mounted to the platform 39 via the drum mount 41. The drum dumper 27 may be activated to move the platform 39 vertically upwards and then rotate it to cause the waste material in the drum 39 to be dumped into the tank 22 via the inlet 30.

Rather than (or in addition to) dumping waste material into the first tank, the transferring of waste material to the first tank may include transferring the waste material from the drum(s) to the tank using vacuum force. For example, when the method involves using an apparatus 100, shown in FIG. 4 and described in more detail below, a vacuum force applied via a vacuum removal conduit 40 may be used to transfer waste material from drum(s) D to a tank 22A which may be used as the first tank. The vacuum force could be generated by any type of pumping device.

In an exemplary embodiment, the waste material may be transferred directly from the drum(s) to the first tank. As used herein, the transferring of the waste material "directly" relates to transferring the waste material to the first tank without storing the waste material for any appreciable length of time intermediate to removing the waste material from the drum(s) and introducing the waste material into the interior of the first tank. In addition, transferring "directly" may also relate to transferring the waste material to the first tank without mixing the waste material from one drum with the waste material of another drum intermediate to removing the waste material from the drums and introducing the waste material into the interior of the first tank.

In the transferring of S10, waste material from a single drum may be transferred to the first tank or waste material from a plurality of drums may be transferred to the first tank. When waste material from a plurality of drums is transferred, the waste material may be transferred from each of the drums one at a time (e.g., one drum after another) or at least partially simultaneously. For example, when the apparatus 10 of FIG. 1 is used in the method, the platform 39 may be configured to receive either a single drum D (e.g., to transfer waste material from either a single drum D or a plurality of drums D one at a time) or a plurality of drums D simultaneously (e.g., to transfer waste material from either a single drum D, a plurality of drums D one at a time, or a plurality of drums D simultaneously).

After waste material is transferred from a drum, the drum may be used to contain additional waste material and that additional waste material may also be transferred to the first tank.

As mentioned above, the method schematically illustrated in FIG. 3 also includes agitating waste material in the first tank with an agitator contained in the first tank (S20). Those of ordinary skill in the art will appreciate that there are a number of different agitators that could be used to perform the agitating. For example, when the agitator includes one or more rotatable sets of blades, like the apparatus 10 described above (or the apparatus 100 described below), the agitating may include rotating the rotatable set(s) of blades. If the waste material transferred to the first tank is either substantially liquid material or a combination of liquid along with solid material and/or semi-solid material, the rotation of the blade set(s) may include directing liquid material toward the floor of the first tank.

If the agitator includes a rotatable auger, like the rotatable auger 25 of the apparatus 10 shown in FIG. 1, the agitating may include rotating the auger. As mentioned in the above description of the apparatus 10, the rotation of the auger 25 may loosen solid and/or semi-solid waste material sedimenting in and around the trough 33 and also convey that material from an end of the tank 22 adjacent to inlet 30 to an end of the tank 22 adjacent to outlet 34. The loosening and conveyance of the sediment material may spread out the material so that it may be blended with liquid in the tank 22. For example, when the agitator also includes one or more of the blade sets 24, the rotation of the blade set(s) 24 may direct liquid in the tank 22 toward the tank floor and thereby blend the liquid with solid and semi-solid material loosened by rotation of the auger 25.

When the first tank includes waste material transferred from a plurality of drums, the agitating of the waste material (S20) may include mixing together the waste material from the plurality of drums. For example, the agitating may mix liquid material from one drum with liquid material from another drum, or mix solid and/or semisolid material from one drum with solid and/or semisolid material from another drum, or mix liquid from one drum with solid and/or semisolid material from another drum, or any combination thereof.

When the first tank contains liquid waste material along with solid waste material and/or semi-solid waste material, the agitating may include blending the materials so as to form a slurry. The slurry may be a flowable slurry capable of being passed to a second tank in the passing (S30) of the method.

In one exemplary method, the agitator that performs the agitation may be driven by a hydraulic system of a truck or tractor trailer optionally associated with the second tank.

The passing (S30) schematically illustrated in FIG. 3 may be accomplished in a number of different ways. For example the waste material could be passed from the first tank to a second tank using vacuum force generated by any type of pump. Alternatively, the waste material could be passed from the first tank to the second tank at least partially using gravity flow.

The second tank of the passing (S30) could be any type of tank on a mobile wheeled chassis. The second tank could be associated with the mobile wheeled chassis in any known fashion. For example, the second tank could be attached to the mobile wheeled chassis, resting on the mobile wheeled chassis, in direct contact with the mobile wheeled chassis, and/or in indirect contact with the mobile wheeled chassis. In one embodiment, the second tank could be attached to and/or resting on a trailer, truck, or train car including a mobile wheeled chassis. In another embodiment, the second tank could be part of a trailer, truck, or train car including a mobile wheeled chassis.

There are a number different possible configurations for the second tank. For example, the second tank on the mobile wheeled chassis could configured in the form of one of the apparatuses disclosed in U.S. Pat. No. 5,275,487, issued Jan. 4, 1994, or U.S. patent application Ser. No. 09/467,902, filed Dec. 21, 1999 (pending; entitled METHOD AND APPARATUS FOR PROCESSING BLACK LIQUOR SEDIMENT), the disclosures of which are incorporated herein by reference in their entirety. In another example, the second tank could be configured like a tank 22A shown in FIG. 4 (described below) optionally lacking a barrel processing area 50A and possibly also other structure shown in FIG. 4.

The second tank may contain an agitator configured to agitate waste material passed from the first tank to the second tank. If so, the method may also include agitating waste material in the second tank.

In one exemplary method, the second tank may be part of either a truck or a truck trailer, and the second tank may be associated with both a device for generating vacuum force to pass waste material from the first tank to the second tank and an agitator for agitating waste material in the second tank. The second tank may be at least temporarily placed in flow communication with the first tank via a flow coupling, such as a hose, coupled to an outlet of the first tank. For example, when the first tank is configured in the form of the tank 22 shown in FIG. 1 or the tank 22A shown in FIG. 4, the second tank may be flow coupled via the outlet 34, 34A, respectively.

As schematically shown in FIG. 3, the method further includes transporting the second tank from a location where the first tank is located (S40). For example, the first tank may be maintained for at least some period of time at a location where there are (and/or possibly will be) drums containing waste material, while the second tank may be used to transport removed waste material to another location and/or be loaded with additional waste material at a different location. In one exemplary practice of the method, the first tank may be located at an industrial area, where the waste material is generated and where the waste material is placed at least temporarily in one or more drums before being transferred to the first tank.

In one exemplary method, the second tank may be transported to a facility configured to provide disposal and/or incineration of waste material, and the method may further include off-loading material from the second tank at the facility so that the material may be disposed and/or incinerated. In one example, the waste material may be burned and the generated heat may be used in some manner, such as when the waste material is burned at a cement kiln.

In another exemplary method, the second tank may be transported to a different location having a third tank similar or identical to the first tank. In such a method, waste material from one or more drums may be transferred to the third tank, agitated in the third tank, and passed to the second tank to enable the second tank to transport the waste material.

The method may also include sensing the amount of material in the first tank. For example, the sensing may include sensing when the level of material in the first tank reaches a predetermined level, and wherein the method may further include providing an indication that the sensed level of material in the first tank has reached the predetermined level. When the apparatus 10 of FIG. 1 is used in the method, the sensing may be performed by the sensor 43 and the transmitting may include sending information via a network using the transmitter 45. In an exemplary method, the second tank may be transported to a location where the first tank is located in response to receipt of the information sent by the transmitter. With such an arrangement, the second tank may be transported to the location of the first tank when the first tank is close to being filled or completely filled and thereby enable the waste material to be transferred to the first tank without significant interruption. In addition, such an arrangement may also allow the second tank to transport waste material while the first tank is maintained for at least a period of time at a location. Alternatively (or additionally), the first tank could be transported to another location having drums containing waste material.

Figure 4:
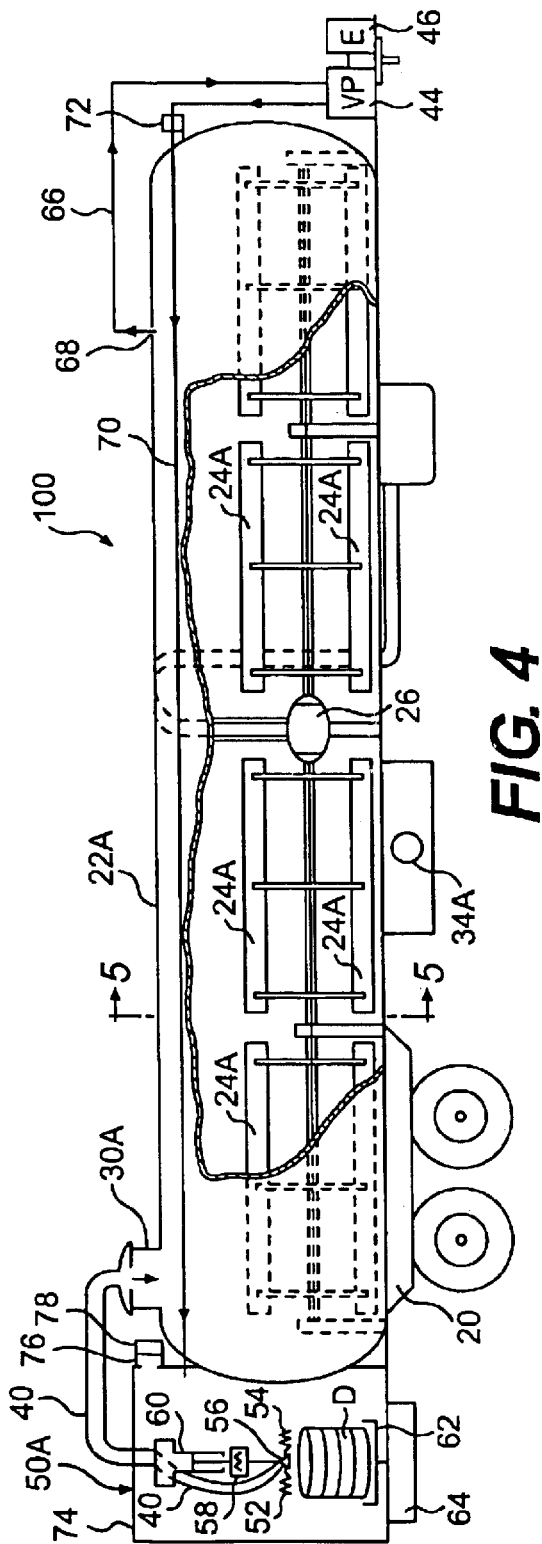
FIG. 4 is a partially schematic side view of an alternative embodiment of an apparatus that could be used in the practice of methods according to invention, with portions of a tank wall and a wall of a processing area broken away to reveal internal components.
Figure 5:
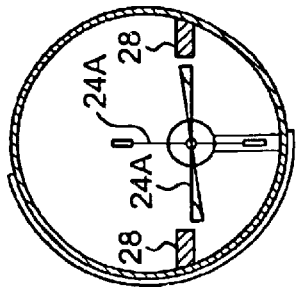
FIG. 5 is a cross-sectional view taken along line 5—5 of FIG. 4.

FIGS. 4 and 5 show an embodiment of a processing apparatus 100 that may be used to practice at least some of aspects of methods of the present invention. As shown in FIG. 1, the processing apparatus 100 includes a mobile wheeled chassis 20, a tank 22A mounted on the chassis 20, an agitator including one or more sets of blades 24A mounted for rotation in an interior of the tank 22A, a motor 26 capable of rotating the blades 24A, and a processing area 50A where material is removed from at least one drum D. For example, the tank 22A is an approximately 6000 gallon pressure-vessel mounted on extended rear and front frames. The chassis 20, tank 22A, blades 24A, and motor 26 may be constructed similar to those of one of the apparatuses disclosed in above-mentioned U.S. Pat. No. 5,275,487 and in above-mentioned U.S. patent application Ser. No. 09/467,902. For example, the motor 26 could be a fifty horsepower motor.

The blades 24A extend along the length of the tank 22A. During activation of the motor 26, the blades 24A rotate about an axis of rotation that is at least substantially parallel with a longitudinal, horizontal axis of the tank 22A. As explained in more detail below, the rotation of the blades 24A agitates materials added to the tank 22A. When solid and/or semi-solid substances are contained in the tank 22A, the agitating may shred those substances into smaller sizes. For example, the apparatus 100 may be configured to be capable of reducing relatively large clumps of solid or sediment to form a slurry that can be burned, for example, at a cement kiln.

As shown in FIG. 5, one or more shearing elements 28 are provided on opposite portions of an inner wall surface of the tank 22A. Each of the shearing elements 28 is located in the tank 22A such that when the blades 24A rotate, tips of the blades 24A pass adjacent to free ends of the shearing elements 28 to shear solid substances between the blades 24A and the shearing elements 28. This may ensure that relatively large substances in the tank 22A are reduced in size during rotation of the blades 24A. Although the tank 22A preferably includes both the blades 24A and the shearing elements 28, one or both of these structural features could be omitted. In addition, the apparatus 100 may include alternative structures capable of reducing particle clump size.

The shearing elements 28 may be mounted to the tank 22A with springs (not shown) that permit at least slight flexing of the shearing elements 28 with respect to a wall the tank 22A, when large solid objects are being agitated. For example, when the tank 22A is used to process industrial waste material that was contained in barrels, rags or relatively large mechanical parts could be passed into the tank 22A.

Each of the shearing elements 28 may be an elongated bar of material that extends along the longitudinal axis of the tank 22A from one end of the tank 22A to another. For example, each of the shearing elements 28 could be a flat bar of material having a rectangular, 4 inch×¼ inch cross-section with adjacent edges forming 90° angles. For example, a space between the blades 24A and shearing elements 28 is approximately ¹⁄₁₆ of an inch. Alternatively, the shearing elements 28 could be a number of other structural configurations. For example, the shearing elements could be a unitary ridge integral with the wall of the tank 22A (not shown), stationary blades on the wall of the tank 22A (not shown), or any structural part of the wall itself.

In an exemplary embodiment, the radially outer edges of the blades 24A and the adjacent, radially inner edges of the shearing elements 28 have mating, jagged teeth (not shown) to increase the surface area between the blades 24A and the shearing elements 28. It is believed that this increased surface area facilitates shearing of substances in the tank 22A.

The tank 22A may have one or more inlets to allow for loading of substances to be processed and one or more outlets to allow for removal of processed substances. As shown in FIG. 4, the tank 22A may include an inlet 30A and an outlet 34A. The inlet 30A and outlet 34A may be capable of being sealed during transportation of the apparatus 100.

FIG. 5 shows additional components of the apparatus 100 in partially schematic form. The processing area 50A may be provided on the rear portion of the tank 22A. At least one wall 74 encloses the processing area 50A to provide a substantially sealed interior. One or more access doors (not shown) may be provided in order to load and unload one or more drums D to or from the processing area 50A. The processing area 50A includes one or more scrapers 52 and 54 configured to scrape solid and/or semi solid substances from the interior of a drum D placed in the processing area 50A. In the embodiment shown in FIG. 4, the scrapers 52 and 54 are opposite facing, coaxial, helical augers coupled to a common gear box 56 that rotates each of the scrapers 52 and 54 about their common axis in a respective direction that causes the scrapers 52 and 54 to loosen substances in the drum and to move the substances from a radially outer portion of the drum D to a radially inner portion of the drum D. For example, the scrapers 52 and 54 could be formed of stainless steel. Although the embodiment shown in FIG. 4 has a pair of scrapers 52 and 54 configured as helical augers, there could be any number of scrapers, including a single scraper, and the scraper(s) could be configured in any manner that loosens solid and sem-solid substances in the drum D. The scrapers 52 and 54 may be configured so that they extend in a plane below (as viewed in FIG. 4) a bottom of the gear box 56 to scrape any solid or semi-solid material in a bottom portion of drum D.

A shaft of a motor 58 is coupled to the gear box 56. The motor 58 may be a non-sparking motor, such as a hydraulically powered motor, that rotates the motor shaft about a longitudinal axis substantially perpendicular to the common axis of the scrapers 52 and 54. An actuator 60 is provided to move the scrapers 52 and 54, gear box 56, and motor 58 along an axis substantially perpendicular to the axes of the scrapers 52 and 54 (substantially parallel to the longitudinal axis of the drum D) to position the scrapers 52 and 54 and gear box 56 in the interior of the drum D by passing them through an open top end of the drum D. For example, the actuator 60 may be a hydraulic cylinder having an internal piston.

Structure may be provided to rotate the drum D and/or the scrapers 52 and 54 with respect to one another. In the embodiment shown in FIG. 4, a rotatable drum-mounting platform 62 is coupled to a rotator 64 configured to rotate the platform 62 at a rate of about 25 RPMs, for example, when the drum D is placed thereon. The platform 62 optionally includes one or more fasteners (not shown), for example four fingers, for securing the drum D on the platform 62 during rotation of the platform 62. For example, the platform 62 could be configured from a device used to rotate an automobile wheel during tire changing. The rotator 64 may include a non-sparking motor, such as a hydraulic motor, and any optional gearing.

During use of the apparatus 100, an optional top lid cover (not shown) is removed from a drum D containing substances, and the drum is placed in the processing area 50A on the platform 62. The rotator 64 is operated to rotate the platform 62 and drum D about an axis substantially parallel to a longitudinal axis of the drum D, and the motor 58 is driven to rotate the scrapers 52 and 54 (via the gear box 56) about an axis substantially perpendicular to the longitudinal axis of the drum D. Then, the actuator is operated to lower the rotating scrapers 52 and 54 into the rotating drum D until the scrapers 52 and 54 are adjacent to a bottom of the drum D, where the scrapers 52 and 54 loosen any solid and/or semi-solid sediment. The scrapers 52 and 54 may be long enough so that free ends of the scrapers 52 and 54 extend closely adjacent to the cylindrical inner wall surface of the drum D (when the drum D has such a wall surface) and thereby loosen and solid and/or semi-solid substances accumulated on the inner wall surface. For example, the free ends of the scrapers 52 and 54 could be spaced apart from one another by about 23 inches for a drum D having a diameter of about 24 inches so that the free ends pass within at least about 0.5 inch of the drum wall. The rotation of the drum D with respect to the scrapers 52 and 54 may ensure that a substantial portion of the entire inner surface of the drum D passes closely adjacent to at least one of the scrapers 52 and 54.

As mentioned above, the scrapers 52 and 54 may be configured so that they force substances radially inward from the wall of the drum D when the scrapers 52 and 54 are rotated. In the embodiment shown in FIG. 4, vacuum force is used to remove the substances loosened by the scrapers 52 and 54 and any liquid in the drum D. The vacuum removal conduit 40 has an inlet opening (not shown) proximate to the gear box 58. The vacuum removal conduit 40 may be a flexible hose having an open end portion coupled to the gear box 56 so that the inlet opening of the vacuum removal conduit 40 passes into the drum D when the actuator 60 moves the scrapers 52 and 54 into the drum D. For example, the conduit 40 could have a diameter of about 4 inches.

As shown in FIG. 4, one end of the conduit 40 is coupled to the tank 22A at the tank inlet 30A to place the conduit 40 in flow communication with the interior of the tank 22. Optionally, the tank inlet 30A has a valve, such as an air-actuated knife valve.

Structure may be provided to create vacuum force in the interior of the tank 22A and this vacuum force may be transmitted through the vacuum removal conduit 40 to pull substances from the drum D into the conduit 40 and convey these substances into the interior of the tank 22A via the inlet 30A. A first end of a vacuum piping 66 is flow coupled to the tank 22A via a port 68 and a second end of the vacuum piping 66 is flow coupled to a vacuum pump 44 that creates a vacuum in the tank 22A.

In the embodiment shown in FIG. 4, a diesel engine 46 drives the vacuum pump 44, and the vacuum pump 44 is a conventional "liquid ring" blower-type pump capable of generating vacuum flow in the conduit 40 that is approximately 2000 cubic feet per minute, for example. A "liquid ring" pump is a spark-less pump capable of pumping flammable substances and also pumping relatively high volumes of fluid. Typically, these types of pumps use water to form a seal between a rotor and a housing, and this water absorbs excess vapor.

As shown in FIG. 4, pump exhaust piping 70 has a first end in flow communication with the positive pressure outlet of pump 44 and a second end in flow communication with the interior of the processing area 50A to permit flow of the pump outlet flow to the processing area 50A. This causes a recycle flow of atmosphere into and out of the processing area to limit escape of any hazardous vapors from the processing area 50. A muffler 74 could be provided in the exhaust piping 70 to reduce the sound level in the processing area 50A.

To further reduce the likelihood of emitting hazardous vapors, the apparatus 100 may include a blower 76 for venting vapor from the processing area 50A, and a filter 78 for filtering this vented vapor. For example, the blower 76 could provide flow of about 600 cubic feet per minute and the filter 78 could include one or more carbon canister filters.

Although only a single rotating drum platform 62 and associated pair of augers 52 and 54 are shown in FIG. 4, there could be a pair of these arrangements in side-by-side relationship to permit simultaneous processing of multiple drums D.

The apparatus 100 may transported to a location, such as an industrial facility, having one or more drums D containing one or more substances, such as industrial byproducts, generated on-site at the location. Since the apparatus 100 shown in FIG. 4 is in the form of a trailer, the apparatus 100 could be towed by a tractor truck. The apparatus could also be transported in variety of other ways via an automobile road, railroad, etc. For example, the apparatus could be a railroad car or a part of a truck rather than being merely a trailer pulled by a truck. By way of example, a separate tank (either mobile or stationary) could be provided and the processing area 50A could be provided on the chassis 20.

An optional top lid cover (not shown) is removed from a drum D, and the drum D is placed on the platform 62 of the processing area 50A either manually or through the use of another device, such as a fork lift. The blower 76 is operated to vent any vapors from the processing area 50A and these vapors are filtered via filter 78. The rotator 64 and motor 58 are activated to cause respective rotation of the drum D and the scrapers 52 and 54. In addition, operation of the vacuum pump 44 is initiated to cause a vacuum flow in the tank 22A and vacuum removal conduit 40. The actuator 60 is operated to lower the rotating scrapers 52 and 54 into the rotating drum D. The scrapers 52 and 54 scrape and loosen any solid and/or semi solid substances in the drum D, especially any such material accumulated on the wall surface or bottom portion of the drum D. When the scrapers 52 and 54 are configured as helical augers, as shown in the embodiment of FIG. 4, the rotation of the augers may force substances radially inward in the drum D.

The vacuum removal conduit 40 removes clumps of the solid and/or semi solid substance loosened in the drum D along with any liquid substance in the drum D. These substances may be conveyed into the tank 22A. After being conveyed to the tank 22A, the scrapers 52 and 54 may be removed from the drum D and one or more additional drums may be placed in the drum processing area 50A to transfer material therefrom in a manner similar to that of the previous drum(s).

The motor 26 is actuated to rotate the blades 24A about their axis of rotation. The rotating blades 24A agitate the solid and liquid substances entering the tank 22A to generally reduce the size of any solid clumps. These clumps are further reduced when tips of the blades 24A rotate adjacent to the shearing elements 28 and thereby shear substances there-between. The solids may be broken down to a size having a dimension no greater than about ⅛ inch, for example.

The rotation of blades 24A in tank 22A also serves to mix the reduced size clumps with liquid passed into tank 22A through conduit 40. When a mixture is formed, the liquid may serve as a carrier for the reduced size clumps. In this form, the resulting mixture may be passed to a second tank via the outlet 34A and then off-loaded from the second tank for incineration and/or other disposal.

It will be apparent to those skilled in the art that various modifications and variations can be made to the structure and methodology of the present invention. It is intended that the present invention cover modifications and variations of what is described herein.

What is claimed is:

1. A method of processing waste material, comprising:
    transferring waste material from at least one drum to a first tank located at a location, wherein the first tank contains an agitator;
    agitating the waste material in the first tank with the agitator;
    passing the waste material from the first tank to a second tank, wherein the second tank is on a mobile wheeled chassis; and
    transporting the second tank away from the location,
    wherein the passing comprises passing the waste material from the first tank to the second tank using vacuum force.

2. A method of processing waste material, comprising:
    transferring waste material from at least one drum to a first tank located at a location, wherein the first tank contains an agitator;
    agitating the waste material in the first tank with the agitator;
    passing the waste material from the first tank to a second tank, wherein the second tank is on a mobile wheeled chassis; and
    transporting the second tank away from the location,
    wherein the location is an industrial area where the waste material is generated.

3. The method of claim 2, wherein the transferring comprises transferring waste material from a plurality of drums to the first tank.

4. The method of claim 3, wherein the waste material is transferred from each of the drums to the first tank one drum at a time.

5. The method of claim 3, wherein the transferring comprises dumping waste material from each of the drums into the first tank.

6. The method of claim 3, wherein the agitating comprises mixing together waste material from the plurality of drums.

7. The method of claim 2, wherein the transferring comprises dumping waste material from the at least one drum into the first tank.

8. The method of claim 2, wherein the transferring comprises transferring the waste material from the at least one drum to the first tank using vacuum force.

9. The method of claim 2, wherein the transferring comprises transferring the waste material directly from the at least one drum to the first tank.

10. The method of claim 2, wherein the at least one drum has a volume of about 55 gallons.

11. The method of claim 2, wherein the waste material transferred from the at least one drum to the first tank comprises liquid waste material.

12. The method of claim 2, wherein the waste material transferred from the at least one drum to the first tank comprises a combination of liquid waste material and at least one of solid material and semi-solid material.

13. The method of claim 12, wherein the agitating comprises blending the liquid waste material and said at least one of solid and semi-solid material so as to form a slurry.

14. The method of claim 13, wherein the passing comprises flowing the slurry to the second tank.

15. The method of claim 2, further comprising placing the at least one drum in a drum processing area where the transferring takes place.

16. The method of claim 2, wherein the waste material comprises waste material generated during an industrial process.

17. The method of claim 2, wherein at least part of the waste material is flammable.

18. The method of claim 2, wherein the agitator contained in the first tank comprises at least one rotatable set of blades, and wherein the agitating comprises rotating the rotatable set of blades.

19. The method of claim 18, wherein the rotating of the rotatable set of blades directs liquid in the first tank toward a floor of the first tank.

20. The method of claim 18, wherein the agitator further comprises at least one rotatable auger, and wherein the agitating further comprises rotating the rotatable auger.

21. The method of claim 2, wherein the agitator comprises a rotatable auger, and wherein the agitating comprises rotating the rotatable auger.

22. The method of claim 2, further comprising sensing the amount of material in the first tank.

23. The method of claim 22, wherein the sensing of the amount of material in the first tank comprises sensing when the level of material in the first tank reaches a predetermined level, and wherein the method further comprises providing an indication that the sensed level of material in the first tank has reached the predetermined level.

24. The method of claim 22, further comprising providing an indication of the sensed amount, wherein the providing comprises transmitting information via a network.

25. The method of claim 24, further comprising transporting the second tank to the location.

26. The method of claim 2, wherein the second tank comprises an agitator configured to agitate waste material passed to the second tank, and wherein the method further comprises agitating waste material in the second tank.

27. The method of claim 2, wherein the transporting further comprises transporting the second tank to a facility configured to provide at least one of disposal and incineration of waste material, and wherein the method further comprises off-loading material from the second tank at the facility.

28. The method of claim 2, further comprising transporting the second tank to a second location where a third tank is located, wherein the third tank contains waste material from at least one drum, and wherein the method further comprises passing waste material from the third tank to the second tank.

29. The method of claim 28, wherein the third tank contains an agitator, and wherein the method further comprises agitating waste material in the third tank with the agitator contained in the third tank.

30. The method of claim 2, wherein the method further comprises scraping, with a scraper, waste material in the at least one drum.

31. The method of claim 30, further comprising removing the scraper from the drum.

32. The method of claim 2, wherein the transporting does not include transporting the first tank.

* * * * *